(12) United States Patent
Chu

(10) Patent No.: US 8,180,953 B2
(45) Date of Patent: May 15, 2012

(54) DATA ACCESSING METHOD FOR FLASH MEMORY, AND STORAGE SYSTEM AND CONTROLLER SYSTEM THEREOF

(75) Inventor: Chien-Hua Chu, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 557 days.

(21) Appl. No.: 12/397,643

(22) Filed: Mar. 4, 2009

(65) Prior Publication Data
US 2010/0180145 A1   Jul. 15, 2010

(30) Foreign Application Priority Data
Jan. 15, 2009   (TW) .............................. 98101405 A

(51) Int. Cl.
*G06F 12/10* (2006.01)
(52) U.S. Cl. ........ 711/103; 711/202; 711/205; 711/206; 711/207; 711/209
(58) Field of Classification Search .................. 711/103, 711/202–203, 205–207, 209, E12.059
See application file for complete search history.

(56) References Cited

U.S. PATENT DOCUMENTS
2009/0089490 A1*  4/2009  Ozawa et al. ................. 711/103
* cited by examiner

*Primary Examiner* — Jasmine Song
(74) *Attorney, Agent, or Firm* — J.C. Patents

(57) ABSTRACT

A data accessing method for accessing data in a plurality of physical page addresses of a plurality of physical blocks in a flash memory chip is provided. The data accessing method includes proving a plurality of logical page addresses for a host system, creating a logical page to physical page mapping table and a physical page to logical page mapping table to record the mapping between the logical page addresses and the physical page addresses. The data accessing method also includes writing data into the physical page addresses, and updating the logical page to physical page mapping table and the physical page to logical page mapping table. The data accessing method further includes determining whether the physical page addresses are valid or invalid based on the logical page to physical page mapping table and the physical page to logical page mapping table.

25 Claims, 12 Drawing Sheets

| logical page index | physical page address |
|---|---|
| 0 | 0 |
| 1 | L+1 |
| 2 | 2 |
| ⋮ | ⋮ |
| 127 | 127 |
| 128 | 128 |
| 129 | L+2 |
| ⋮ | ⋮ |
| L | L |

140

| physical page index | logical page address |
|---|---|
| 0 | 0 |
| 1 | 1 |
| 2 | 2 |
| ⋮ | ⋮ |
| 127 | 127 |
| 128 | 128 |
| 129 | 129 |
| ⋮ | ⋮ |
| L | L |
| L+1 | 1 |
| L+2 | 129 |
| L+3 | NULL |
| ⋮ | ⋮ |
| 128D−1 | NULL |

| physical block index | invalid physical page address counter number |
|---|---|
| 120-(S+1) | 0 |
| 120-(S+2) | 0 |
| 120-(S+3) | 0 |
| ⋮ | ⋮ |
| 120-(S+D) | 0 |

170

(b)

| physical block index | invalid physical page address counter number |
|---|---|
| 120-(S+1) | 1 |
| 120-(S+2) | 0 |
| 120-(S+3) | 0 |
| ⋮ | ⋮ |
| 120-(S+D) | 0 |

170

(c)

| physical block index | invalid physical page address counter number |
|---|---|
| 120-(S+1) | 1 |
| 120-(S+2) | 1 |
| 120-(S+3) | 0 |
| ⋮ | ⋮ |
| 120-(S+D) | 0 |

DATA ACCESSING METHOD FOR FLASH MEMORY, AND STORAGE SYSTEM AND CONTROLLER SYSTEM THEREOF

CROSS-REFERENCE TO RELATED APPLICATION

This application claims the priority benefit of Taiwan application serial no. 98101405, filed on Jan. 15, 2009. The entirety of the above-mentioned patent application is hereby incorporated by reference herein and made a part of this specification.

BACKGROUND

1. Field of the Invention

The present invention relates to a data accessing method of a flash memory storage system and a flash memory controller system of using the same.

2. Description of Related Art

With the booming market of digital cameras, camera cell phones and MP3 players in recent years, demand for memory storage devices by consumers are rapidly increasing. Flash memories having the advantages of non-volatility, power-saving, small size and having no mechanical structure are suitable in portable applications, especially suitable for these types of portable products that are powered by batteries. Solid state drive (SSD) is a storage device using NAND flash memory as a storage medium.

Typically, the flash memory chip of the flash memory storage system is divided into several physical blocks and each physical block is further divided into several pages. The physical block is the erase unit of the flash memory and the page is the write unit of the flash memory. While the memory cells of the flash memory are programmed, the memory cells can only be unidirectional programmed (i.e. the memory cell can only be programmed from logic 1 to logic 0). Hence, the programmed page (i.e. the page having been used to store outdated data) can not be directly written with data and needed to be erased and then to be re-programmed. More particularly, since the physical block is the erase unit in the erase operation implemented on the flash memory, it is necessary to erase whole physical block when it is going to implement the erase operation to the data stored in the page of the corresponding physical block. Therefore, the conventional writing mechanism of the flash memory is implemented on a block-by-block basis. For example, in the conventional writing method, the physical blocks defined as data area and spare area. The physical blocks which are defined as the data area are used to store valid data written by the write instruction and the physical blocks defined as the spare area are used to replace the physical blocks in the data area as the write instruction is implemented. Practically, when the flash memory storage system receives the write instruction from the host system so as to implement the write operation on the physical blocks in the data area, the flash memory storage system fetches the physical blocks in the spare area and writes the valid outdated data in the physical block to be updated and the new data to be written to the fetched physical block from the spare area. Therefore, the physical block which is written with new data is correlated to the data area and the original physical block in the data area is erased and correlated to the spare area. In order, for the host system, to successfully access the physical blocks, which store data in an alternative way, the flash memory storage system allocates logical blocks for being accessed by the host system. The logical blocks are allocated according to the dimension of one or more physical blocks. On the other words, the flash memory storage system creates a logical block-physical block mapping table for recording and updating the mapping relationships between the logical blocks and the physical blocks in the data area in order to reflect the alternation between the physical blocks. Therefore, the host system accesses the flash memory storage system in accordance with the provided logical blocks and the flash memory storage system practically reads data from or writes data into the physical blocks mapping to the logical blocks according to the logical block-physical block mapping table.

Therefore, when the host system only updates a part of the data in one logical block, the data accessing method mentioned above comprises not only the action of writing new data but also the action of moving the valid outdated data within the physical blocks. More particularly, when the data quantity of the updated data is small but the data quantity of the valid outdated data is large, the time for accomplishing the write operation mentioned above is substantially increased. Specifically, the flash memory (i.e. SSD) is gradually used as the primary hard disk in the current trend of computer development and the computer operating system possesses the properties such as small amount of updated data and frequently implementing the updating process so that data writing speed of the flash memory chip seriously affects the performance of the computer system. Hence, it is necessary to develop a data accessing method capable of decreasing data moving movements so that the data writing speed for writing data into the flash memory is improved.

SUMMARY

Accordingly, an exemplary embodiment of the present invention provides a data accessing method capable of writing data into a flash memory chip with less data moving movements so that the data writing speed of the flash memory is improved.

Another exemplary embodiment of the present invention also provides a controller system capable of writing data into a flash memory chip with less data moving movements so that the data writing speed of the flash memory is improved.

Another exemplary embodiment of the present invention further provides a flash memory storage system capable of writing data with less data moving movements so that the data writing speed of the flash memory is improved.

To achieve these and other advantages of the invention, as embodied and broadly described herein, the exemplary embodiment of the invention provides a data accessing method operated by a flash memory controller to access data from a plurality of physical page addresses of a plurality of physical blocks in at least a flash memory chip. The data accessing method comprises steps of providing a plurality of logical page addresses for being accessed by a host system and creating a logical page-to-physical page mapping table to record the physical page addresses mapping to the logical page addresses respectively and then creating a physical page-to-logical page mapping table to record the logical page addresses mapping to the physical page addresses respectively. The data accessing method also comprises steps of receiving a data to be written and a logical page address to be written from the host system, writing the data to be written into one of the physical page addresses, updating the logical page-to-physical page mapping table to record the logical page address to be written mapping to the physical page address, in which the data to be written is written, and updating the physical page-to-logical page mapping table to record the physical page address, in which the data to be written is written, mapping to the logical page address to be written. The data accessing method further comprises step of comparing the logical page-to-physical page mapping table with the physical page-to-logical page mapping table to determine a plurality of valid physical page addresses and a plurality of invalid physical page addresses among the written physical page addresses.

The exemplary embodiment of the present invention also provides a controller system for writing data into a plurality physical page addresses of a plurality of physical blocks in at least a flash memory chip. The controller system comprises a host interface unit for connecting to a host system, a microprocessor unit, a flash memory interface unit for connecting the at least flash memory chip, a buffer memory for temporally storing data, a logical page-to-physical page mapping table, a physical page-to-logical page mapping table and a page management module. The microprocessor unit is used for receiving a data to be written and a logical page address to be written from the host system. The logical page-to-physical page mapping table is used for recording the physical page addresses mapping to a plurality of logical page addresses respectively. The physical page-to-logical page mapping table is used for recording the logical page addresses mapping to the physical page addresses respectively. The page management module is used for writing the data to be written into one of the physical page addresses, updating the logical page-to-physical page mapping table to record the logical page address to be written mapping to the physical page address, in which the data to be written is written, and updating the physical page-to-logical page mapping table to record the physical page address, in which the data to be written is written, mapping to the logical page address to be written. Furthermore, the page management module compares the logical page-to-physical page mapping table with the physical page-to-logical page mapping table to determine a plurality of valid physical page addresses and a plurality of invalid physical page addresses among the written physical page addresses.

The exemplary embodiment of the present invention further provides flash memory storage system. The flash memory storage system comprises a plurality of physical page addresses belonging to a plurality of physical blocks, a connector for connecting a host system, a flash memory controller electrically connected with the physical page addresses and the connector, a logical page-to-physical page mapping table and a physical page-to-logical page mapping table. The logical page-to-physical page mapping table is used for recording the physical page addresses mapping to a plurality of logical page addresses respectively. The physical page-to-logical page mapping table is used for recording the logical page addresses mapping to the physical page addresses respectively. The flash memory controller is used for receiving a data to be written and a logical page address to be written from the host system. Furthermore, the flash memory controller further writes the data to be written into one of the physical page addresses, updates the logical page-to-physical page mapping table to record the logical page address to be written mapping to the physical page address, in which the data to be written is written, and updates the physical page-to-logical page mapping table to record the physical page address, in which the data to be written is written, mapping to the logical page address to be written. Moreover, the flash memory controller compares the logical page-to-physical page mapping table with the physical page-to-logical page mapping table to determine a plurality of valid physical page addresses and a plurality of invalid physical page addresses among the written physical page addresses.

In the exemplary embodiment of the present invention, the logical page-to-physical page mapping table and the physical page-to-logical page mapping table are used to record the mapping relationships between the logical page addresses and the physical page addresses. Therefore, the write operation is operated on the flash memory chip on a page-by-page basis. Hence, the performance of the flash memory storage system is effectively improved.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the exemplary embodiments of the invention, and are incorporated in and constitute a part of this specification. The drawings illustrate exemplary embodiments of the invention and, together with the description, serve to explain the principles of the invention.

FIGS. 4A through 4C are diagrams showing examples of logical page-to-physical page mapping table and physical page-to-logical page mapping table according to one embodiment of the invention.

FIG. 7 is a diagram showing examples of physical block invalid page address counter table according to one embodiment of the invention.

DESCRIPTION OF THE PREFERRED EMBODIMENTS

Figure 1:
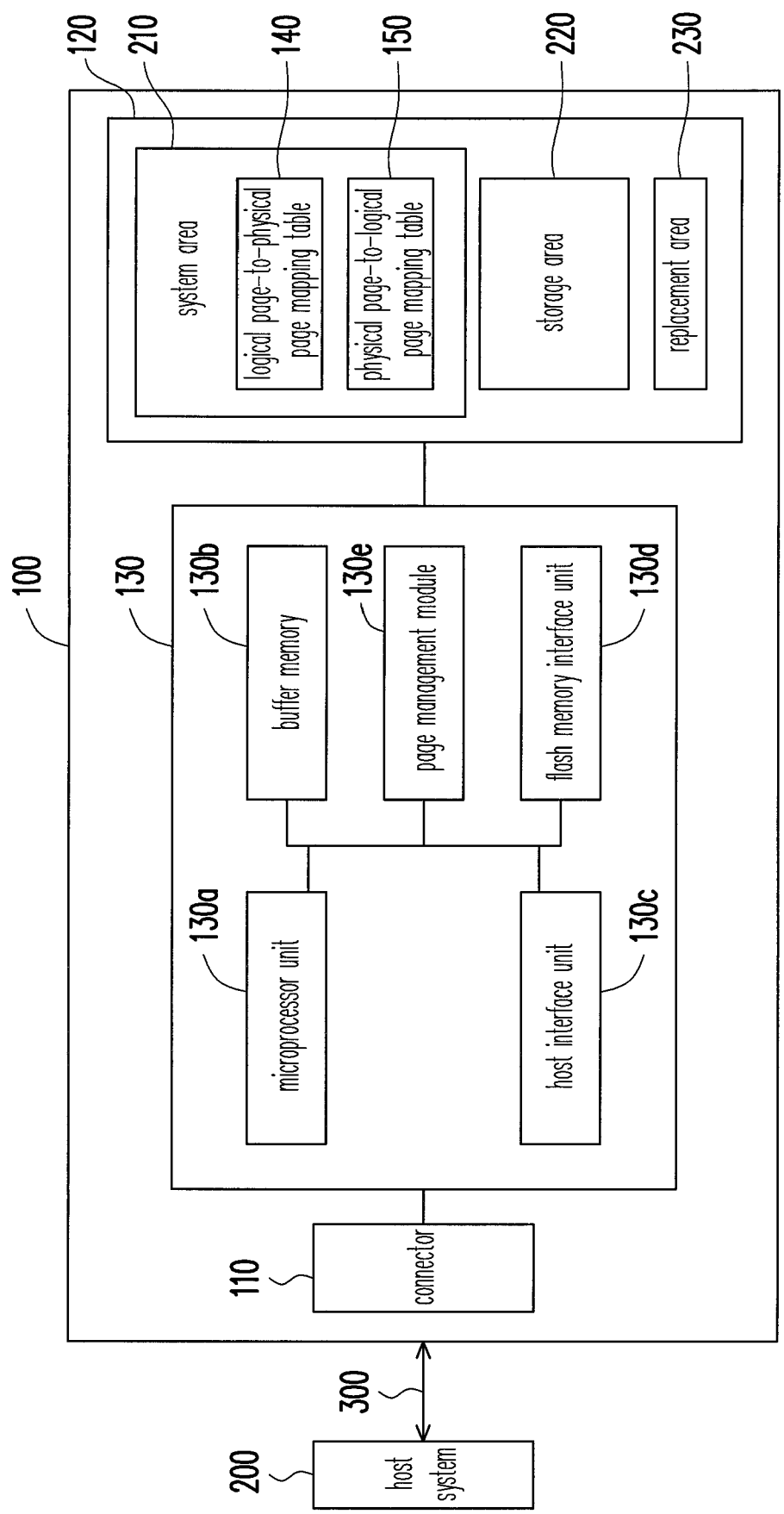
FIG. 1 is a schematic block diagram showing a flash memory storage system according to one embodiment of the invention.

FIG. 1 is a schematic block diagram showing a flash memory storage system according to one embodiment of the invention. As shown in FIG. 1, a flash memory storage system 100 comprises a connector 110, a flash memory chip 120 and a controller system including a flash memory controller 130, a logical page-to-physical page mapping table 140 and a physical page-to-logical page mapping table 150.

Usually, the flash memory storage system 100 is operated with a host system 200 so that the host system 200 can write the data into the flash memory storage system 100 or read the data from the flash memory storage system 100. In the present embodiment, the flash memory storage system 100 is a solid state drive (SSD). It should be understood that the flash memory storage system 100 in another embodiment of the present invention can also be a memory card or a portable drive.

The connector 110 is electrically connected to the flash memory controller 130 and is removably connected to the host system through a bus 300. In the present embodiment, the connector 110 is an SATA connector. It should be understood that the present invention is not limited to by the types of the connector 110. That is, the connector 110 can be, for example but not limited to, a USB connector, an IEEE 1394 connector, a PCI Express connector, an MS connector, an MMC connector, an SD connector, a CF connector, an IDE connector or other proper connectors.

The flash memory chip 120 is electrically connected to the flash memory storage controller 130 for storing data. In the present embodiment, the flash memory chip 120 is a multi level cell (MLC) NAND flash memory. It should be noticed that the present invention is not limited to by the types of the flash memory chip 120. That is, in another embodiment of the present invention, a single level cell (SLC) NAND flash memory can be also applied into the present invention.

Figure 2:
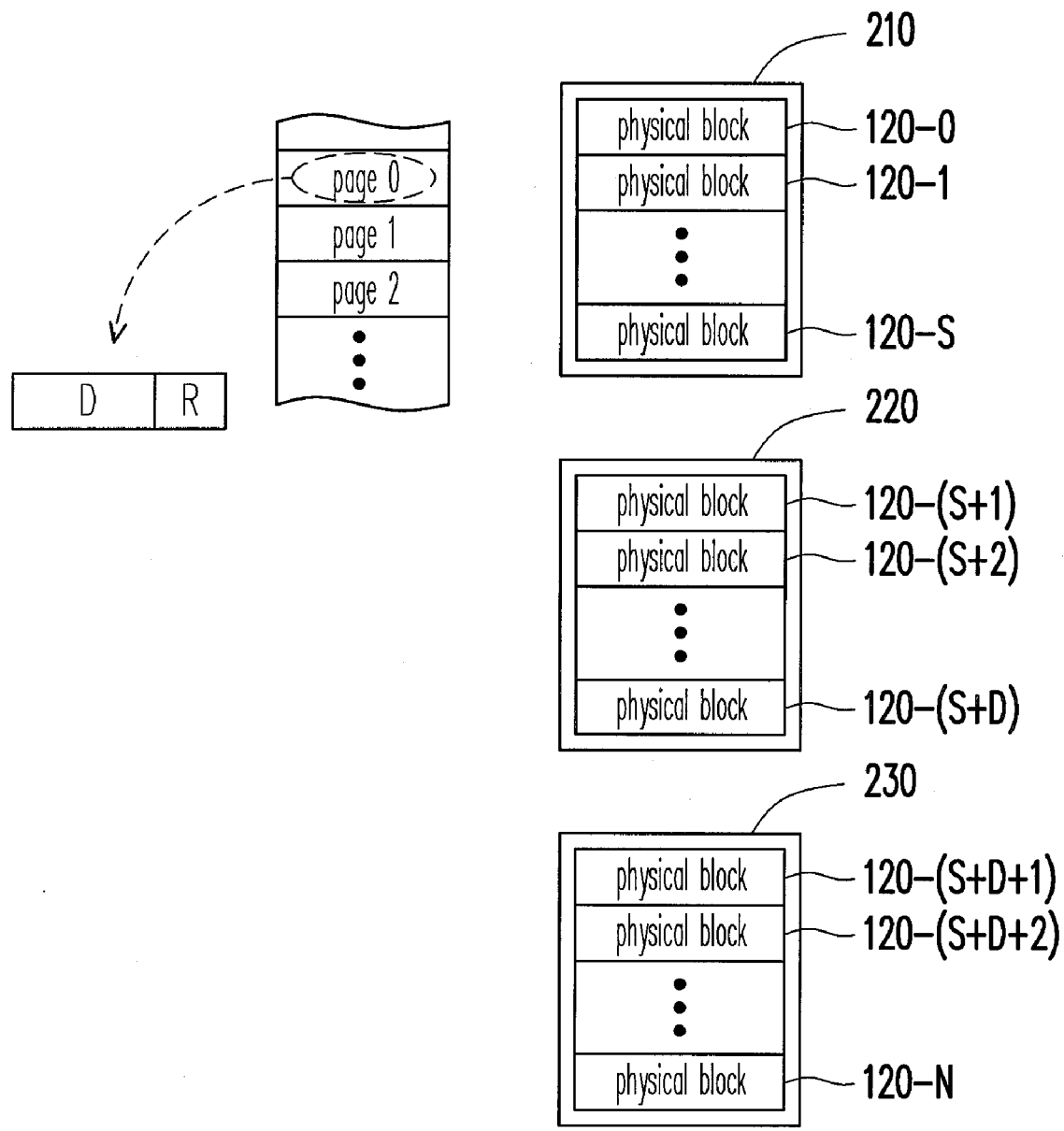
FIG. 2 is a schematic block diagram showing a flash memory chip according to one embodiment of the invention.

FIG. 2 is a schematic block diagram showing a flash memory chip according to one embodiment of the invention. It should be noticed that, basing on the logic concept, the terms including "selecting", "moving", "dividing", "replacement", "alternating" and "classifying" are used to describe the operations of the flash memory chip for operating the physical blocks of the flash memory chip 120. On the other words, the physical blocks of the flash memory are logically operated and the actual positions of the physical blocks of the flash memory are not changed. Noticeably, the operations of the flash memory chip 120, such as write operation, read operation and erase operation, are controlled by the flash memory controller 130.

As shown in FIG. 2, the flash memory chip 120 has several physical blocks 120-0 through 120-N. Generally speaking, in the flash memory, the physical block is the minimum unit to be erased. That is, each physical block contains the minimum number of memory cells to be erased in once erasing operation. In the present exemplary embodiment, each of the physical blocks 120-0 through 120-N contains 128 pages and the page is the minimum unit to be programmed. On the other words, the page is the minimum unit to be written or read. Each page contains a user area D and a redundancy area R. The user area D is used for storing the user information and the redundancy area R is used for storing the system information, such as ECC codes, logical page addresses mapping to the physical page addresses. In the present embodiment, the user area D is 512 bytes and the redundancy area R is 16 bytes.

The physical blocks 120-0 through 120-N logically divided into system area 210, storage area 220 and replacement area 230.

The physical blocks 120-0 through 120-S which are classified to be the system area 210 are used to store the system information including the logical page-to-physical page mapping table 140, physical page-to-logical page mapping table 150, the number of the physical blocks of the flash memory chip 120, the number of the page addresses of each the physical block and the relationships between the logical page addresses and the physical page addresses.

The physical blocks 120-(S+1) through 120-(S+D) which are classified to be the storage area 220 are used to store the data written by the host system 200. That is, the flash memory storage system 100 actually stores the data written by the host system in the physical blocks 120-(S+1) through 120-(S+D) which are classified to be the storage area 220.

The physical blocks 120-(S+D+1) through 120-N which are classified to be the replacement area 230 are the replacement physical blocks. Specifically, about four percent of the physical blocks in the flash memory chip 120 at the time it is produced are reserved for replacement use. That is, when the physical blocks in the storage area 220 are damaged, the reserved physical blocks in the replacement area 230 can be used to replace the damaged physical blocks. Therefore, when the physical blocks in the storage area 220 are damaged and the replacement area 230 still has available physical blocks, the flash memory controller 130 can fetch the available physical blocks in the replacement area 230 to replace the damaged physical blocks. When the physical blocks in the storage area 220 are damaged and there is no available physical block in the replacement area 230, the flash memory storage system 100 is declared to be fail.

Figure 3:
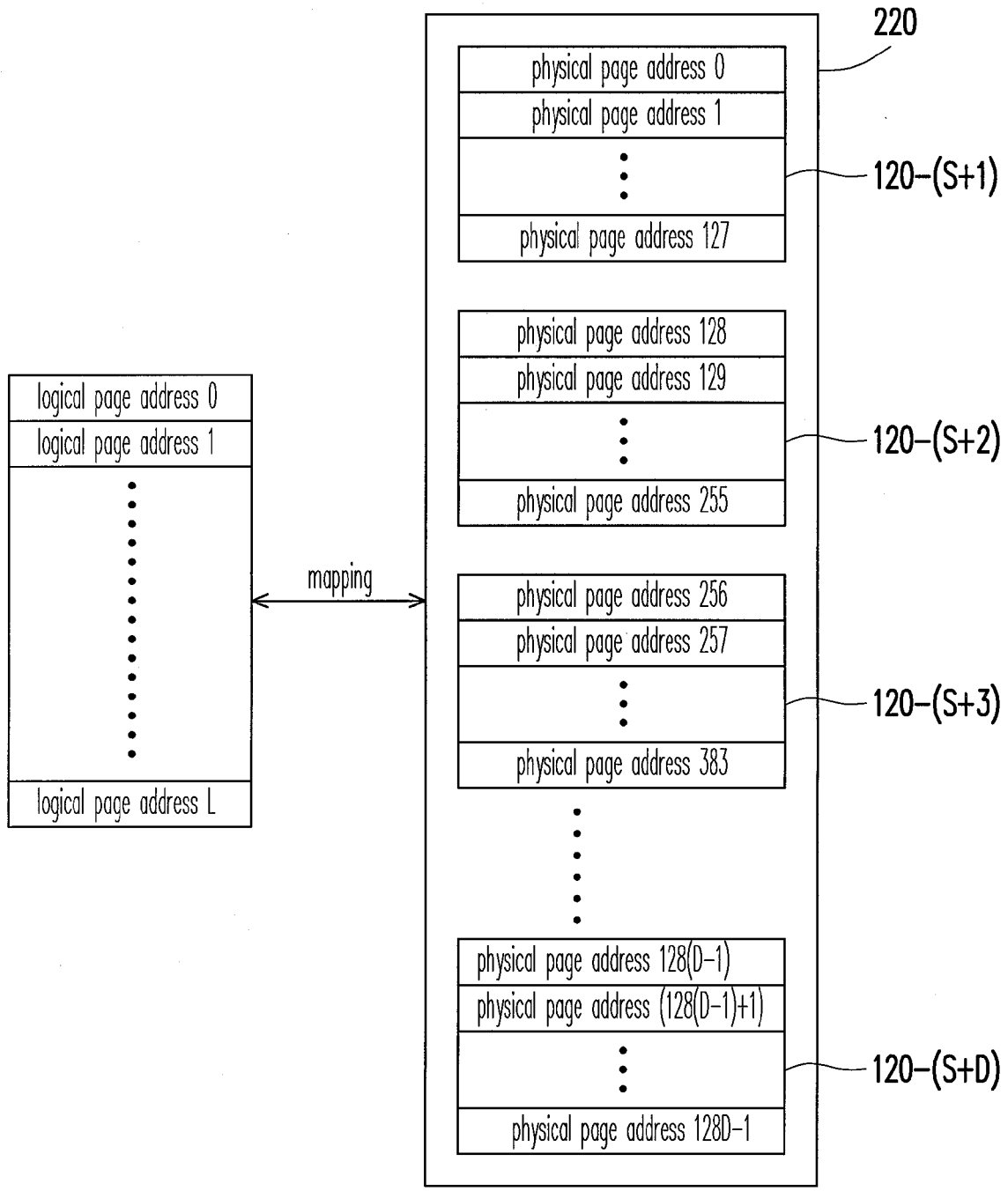
FIG. 3 is a schematic diagram showing the storage area of the flash memory chip according to one embodiment of the invention.

FIG. 3 is a schematic diagram showing the storage area of the flash memory chip according to one embodiment of the invention.

As shown in FIG. 3, each of the physical blocks in the storage area 220 contains 128 page addresses so that the physical blocks 120-(S+1) through 120-(S+D) in the storage area 220 together contain 128×D physical page addresses. The physical page addresses 0 through 127 are belong to the physical block 120-(S+1), the physical page addresses 128 through 255 belong to the physical block 120-(S+2), the physical page addresses 256 through 383 belong to the physical block 120-(S+3), . . . , the physical page addresses 128(D-1) through 128D-1 belong to the physical block 120-(S+D). Additionally, in this embodiment of the present invention, the flash memory storage system 100 provides logical page addresses 0 through L, which map to the physical page addresses in the storage area 220, for being accessed by the host system 200. In the embodiment of the present invention, S, D and L are integers and are customized by the designer according to the capacity of the flash memory chip 120. Generally, the number of the physical page address is larger than the number of the logical page addresses.

As shown in FIG. 1, the flash memory controller 130 executes several instructions with the hardware type, the software type or the firmware type to carry out the operations, such as data storing, data reading and data erasing, in coordination with the connector 110 and the flash memory chip 120. The flash memory controller 130 comprises a microprocessor unit 130a, a buffer memory 130b, a host interface unit 130c and a flash memory interface module 130d.

The microprocessor unit 130a is used for controlling the operations of the rest of elements of the flash memory storage controller 130. For example, the microprocessor unit 130a is used in coordination with the buffer memory 130b, the host interface unit 130c, the flash memory interface module 130d and the page management module 130e to carry out the instructions including write, read and erase on the flash memory storage system 100.

The buffer memory 130b is coupled to the microprocessor unit 130a and is used for temporally storing the system information or the data written by the host system 200. In this embodiment, the buffer memory 130b is a static random access memory (SRAM). It should be understood that the present invention is not limited to by the types of the buffer memory 130b. The buffer memory 130c can be, for example but not limited to, a dynamic random access memory (DRAM), a magnetoresistive random access memory (MRAM), a phase change random access memory (PRAM) or other proper memories.

The host interface unit 130c is coupled to the microprocessor 130a and is used for receiving and identifying the instructions transmitted from the host system 200. That is, the instructions and data from the host system 200 are transmitted to the microprocessor 130a through the host interface unit 130c. In the present embodiment, the host interface unit 130c is an SATA interface. It should be understood that the present invention is not limited by the types of the host interface unit 130c. The host interface unit 130c can be, for example but not limited to, a USB interface, an IEEE 1394 interface, a PCI Express interface, an MS interface, an MMC interface, an SD interface, a CF interface, an IDE interface or other proper data transmission interfaces. More particularly, the host interface unit 130c is corresponding to the connector 110. That is, the host interface unit 130c could be compatible with the connector 110.

The flash memory interface module 130d is coupled to the microprocessor unit 130a and is used for accessing the flash memory chip 120. That is, the data to be written into the flash memory chip 120 is converted to be in a format accepted by the flash memory chip 120 by the flash memory interface module 130d. Specifically, the flash memory interface module 130d can support the flash memory interface signals such as the chip enabling signal (CE), the command latching signal (CLE), the address latching signal (ALE), the read control signal (RE), the write control signal (WE), the write protection signal (WP), the chip status signal (R/B) and several data input/output signals (I/O).

A page management module 130e is used for managing the flash memory chip 120 under the control of the microprocessor unit 130a.

In the present embodiment, the page management module 130e is practically embedded in a form of firmware type within the flash memory controller 130. For example, the page management module 130e containing several programming instructions is burned in a program memory, such as read only memory (ROM), and the program memory is embedded into the flash memory controller 130. When the flash memory storage system 100 is operated, the microprocessor unit 130a loads the page management module 130e from the program memory to operate the erase operation, the read operation and write operation on the flash memory chip 120.

Furthermore, in another embodiment of the invention, the page management module 130e can be stored in a particular area of the flash memory chip 120 in a form of software type (for example, the page management module 130e can be store in the system area 210 of the flash memory chip 120). When the flash memory storage system 100 is operated, the page management module 130e is loaded to the buffer memory 130b to operate the erase operation, the read operation and write operation on the flash memory chip 120 under the control of the microprocessor unit 130a.

Moreover, in another embodiment of the invention, the page management module 130e can be directly laid out in the flash memory controller 130 in a form of hardware type such as logic gate.

In addition, although it is not shown in this embodiment, the flash memory controller 130 can further comprises an error correcting module and a power management module foe controlling the general function modules of the flash memory.

The microprocessor unit 130a executes the page management module 130e so as to operate the logical page-to-physical page mapping table 140 for recording the physical page addresses mapping to the logical page addresses 0 through L respectively. The microprocessor unit 130a executes the page management module 130e so as to operate the physical page-to-logical page mapping table 150 for recording the logical page addresses mapping to the physical page addresses 0 through 128D-1. For example, the logical page-to-physical page mapping table 140 and the physical page-to-logical page mapping table 150 are stored in the system area 210 of the flash memory chip 120. While the flash memory storage system 100 is operated, the logical page-to-physical page mapping table 140 and the physical page-to-logical page mapping table 150 are loaded into the buffer memory 130b and operated by the page management module 130e and are occasionally or regularly re-stored into the system area 210 of the flash memory chip 120 to prevent the updated contents from being lost caused by the abnormal power-off of the flash memory storage system 100.

Specifically, in the embodiment of the present invention, when the host system 200 writes data into any of the logical page addresses 0 through L, the program instruction of the page management module 130e is executed by the microprocessor unit 130a of the flash memory controller 130 to write the data into the physical blocks 120-(S+1) through 120-(S+D) in order. Specifically, when the program instruction of the page management module 130e is executed to start storing the data written by the host system 200 into the physical block 120-(S+1), no matter which of the logical page addresses the host system 200 writes the data into, the instructions of the page management module 130e is executed to write the data into the physical page addresses 0 through 127 in order. Further, when the program instruction of the page management module 130e is executed to start storing the data written by the host system 200 into the physical block 120-(S+2), no matter which of the logical page addresses the host system 200 writes the data into, the instructions of the page management module 130e is executed to write the data into the physical page addresses 128 through 255 in order. On the other words, while the host system writes the data, the program instruction of the page management module 130e is executed to write the data into the physical page addresses within one physical blocks in order, and when all of the physical page addresses in this physical block are done with data writing, another physical block which is not written with data is successively selected for being written with data into the physical page addresses therein in order.

Particularly, after the program instruction of the page management module 130e is executed to write data into the physical page address, the program instruction of the page management module 130e is executed to update the logical page-to-physical page mapping table 140 and the physical page-to-logical page mapping table 150 in order to correctly record the mapping relationship between the logical page address and the physical page address.

Noticeably, in the embodiment of the present invention, the page management module 130e further comprises an available physical page pointer for pointing out a next physical page address which is available for being written. Therefore, when the flash memory controller 130 executes the program instruction of the page management module 130e to write the date to be written by the host system 200, the data can be written into the physical page addresses of the flash memory chip 120 in order according to the available physical page pointer.

Moreover, it should be noticed that, in another embodiment, when the flash memory chip 120 is a MLC-NAND flash memory chip and the writing method is to write the data to the lower page having a writing speed faster than that of the upper page within the same physical block, the program instruction of the page management module 130e is executed to write the date into the physical page addresses of the lower page from the small physical page address to the large physical page address since the physical page addresses of the lower page are not continuous. Meanwhile, the available physical page pointer points the next physical page address available for being written with data from the small physical page address to the large physical page address according to the physical page addresses of the lower page.

Additionally, when the available physical page pointer is changed to point to another physical block from one physical block, the physical page addresses, having the smallest address number, of the foremost erased physical block among the non-written physical blocks is selected to be the next physical page address available for being written with date according to the erasing order of the physical blocks. Further, the easing order of the physical blocks can be obtained from a block easing order record (not shown).

Figure 4A:
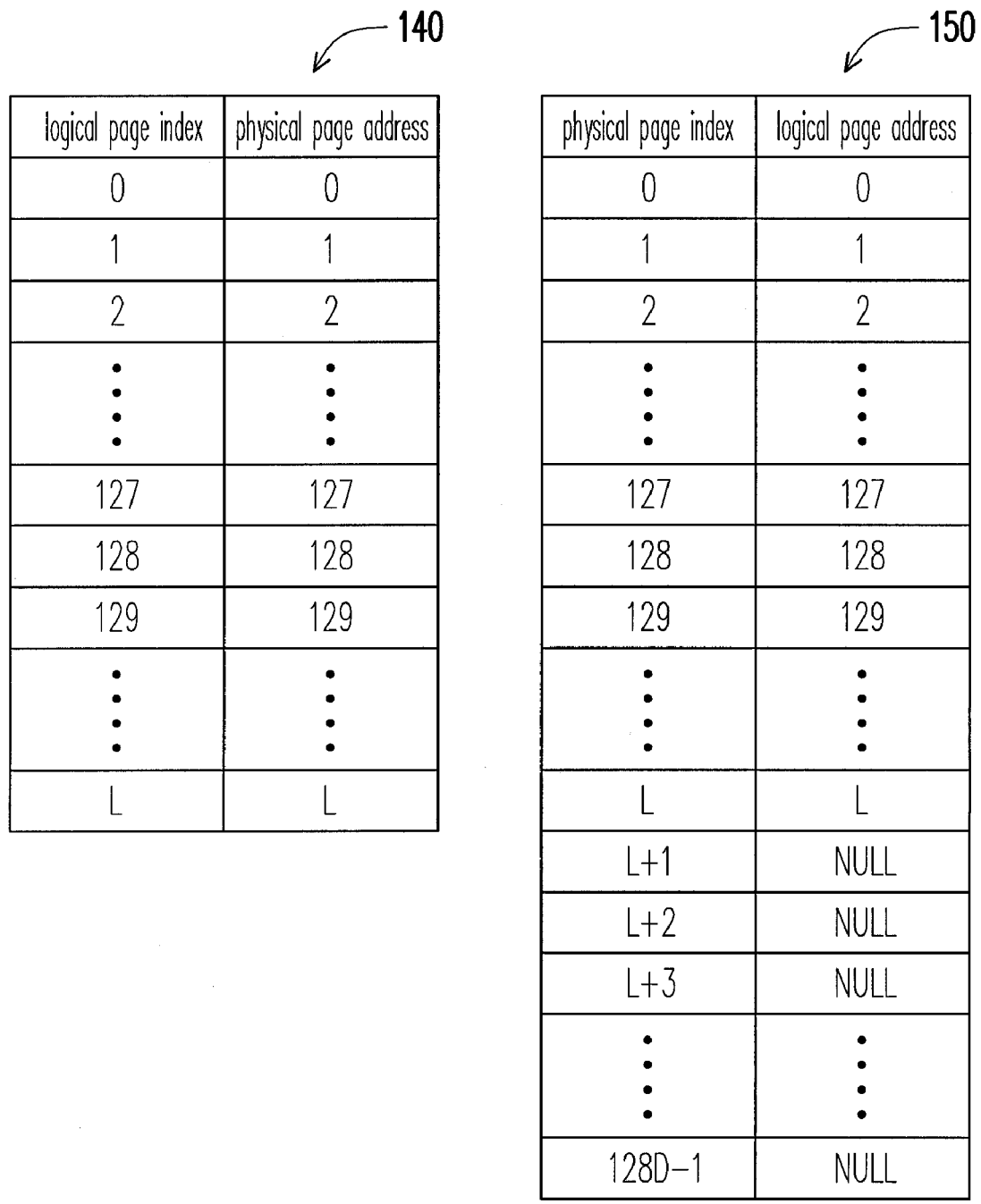
Figure 4B:
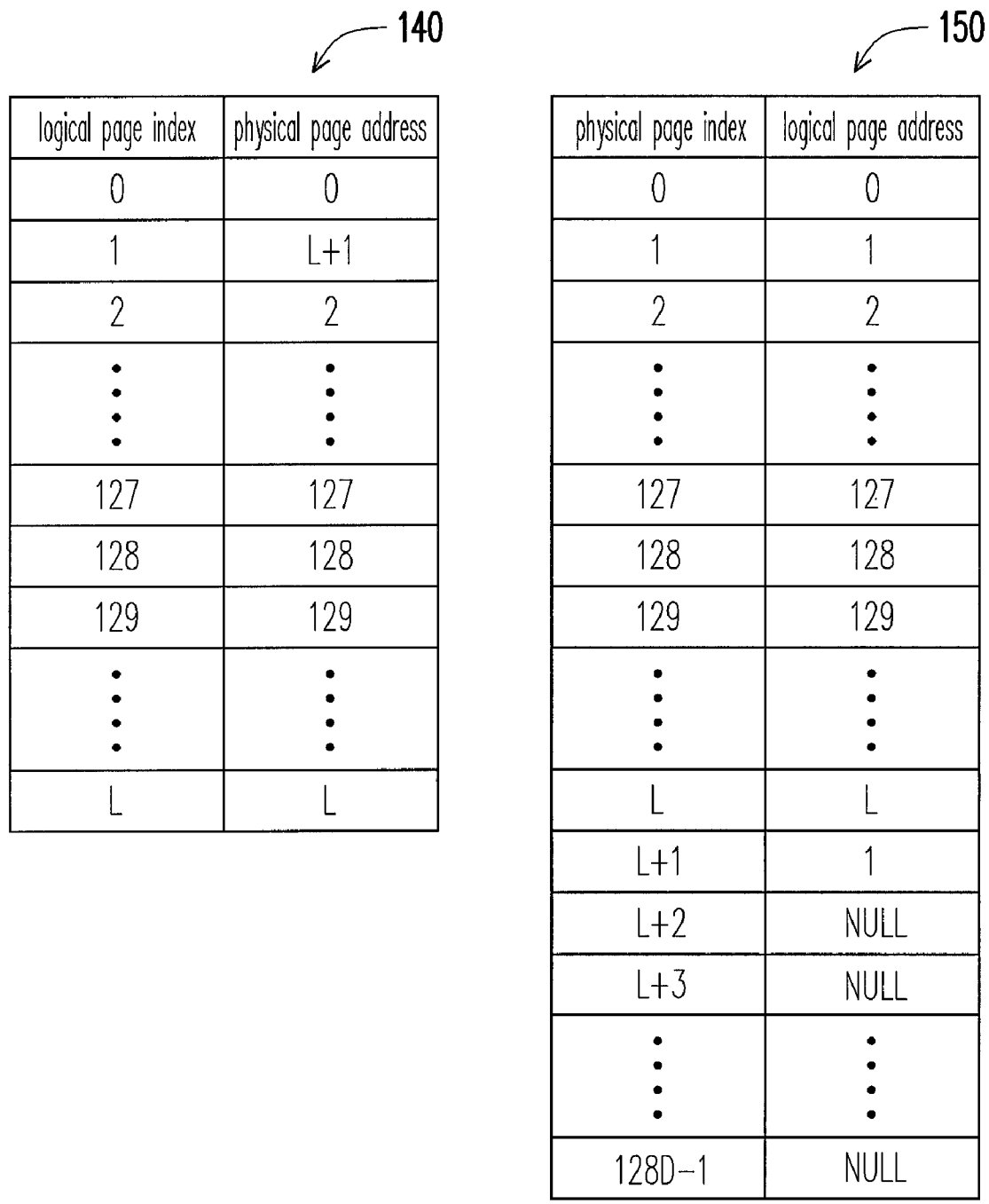

FIGS. 4A through 4C are diagrams showing examples of logical page-to-physical page mapping table and physical page-to-logical page mapping table according to one embodiment of the invention.

As shown in FIG. 4A, the logical page addresses 0 through L are supposed to map to the physical page addresses 0 through L respectively. That is, the physical page addresses 0 through L store the data written into the logical page addresses 0 through L by the host system 200 respectively. Hence, the logical page-to-physical page mapping table 140 and the physical page-to-logical page mapping table 150 are used to record these mapping relationships and, meanwhile, the available physical page pointer points to the physical page address (L+1).

While the host system 200 is about to write the date into the logical page address 1, the program instruction of the page management module 130e is executed to write the data into the physical page address (L+1) according to the available physical page pointer and the available physical page pointer is changed to point to the physical page address (L+2). At this moment, the program instruction of the page management module 130e is executed to update the logical page-to-physical page mapping table 140 so that the logical page address 1 maps to the physical page address (L+1) and to update the physical page-to-logical page mapping table 150 so that the physical page address (L+1) maps to the logical page address 1 (as shown in FIG. 4B).

Furthermore, while the host system 200 is about to write the data into the logical address 129, the program instruction of the page management module 130e is executed to write the data into the physical page address (L+2) according to the available physical page pointer and the available physical page pointer is changed to point to the physical page address (L+3). At this moment, the program instruction of the page management module 130e is executed to update the logical page-to-physical page mapping table 140 so that the logical page address 129 maps to the physical page address (L+2) and to update the physical page-to-logical page mapping table 150 so that the physical page address (L+2) maps to the logical page address 129 (as shown in FIG. 4C).

Figure 5:
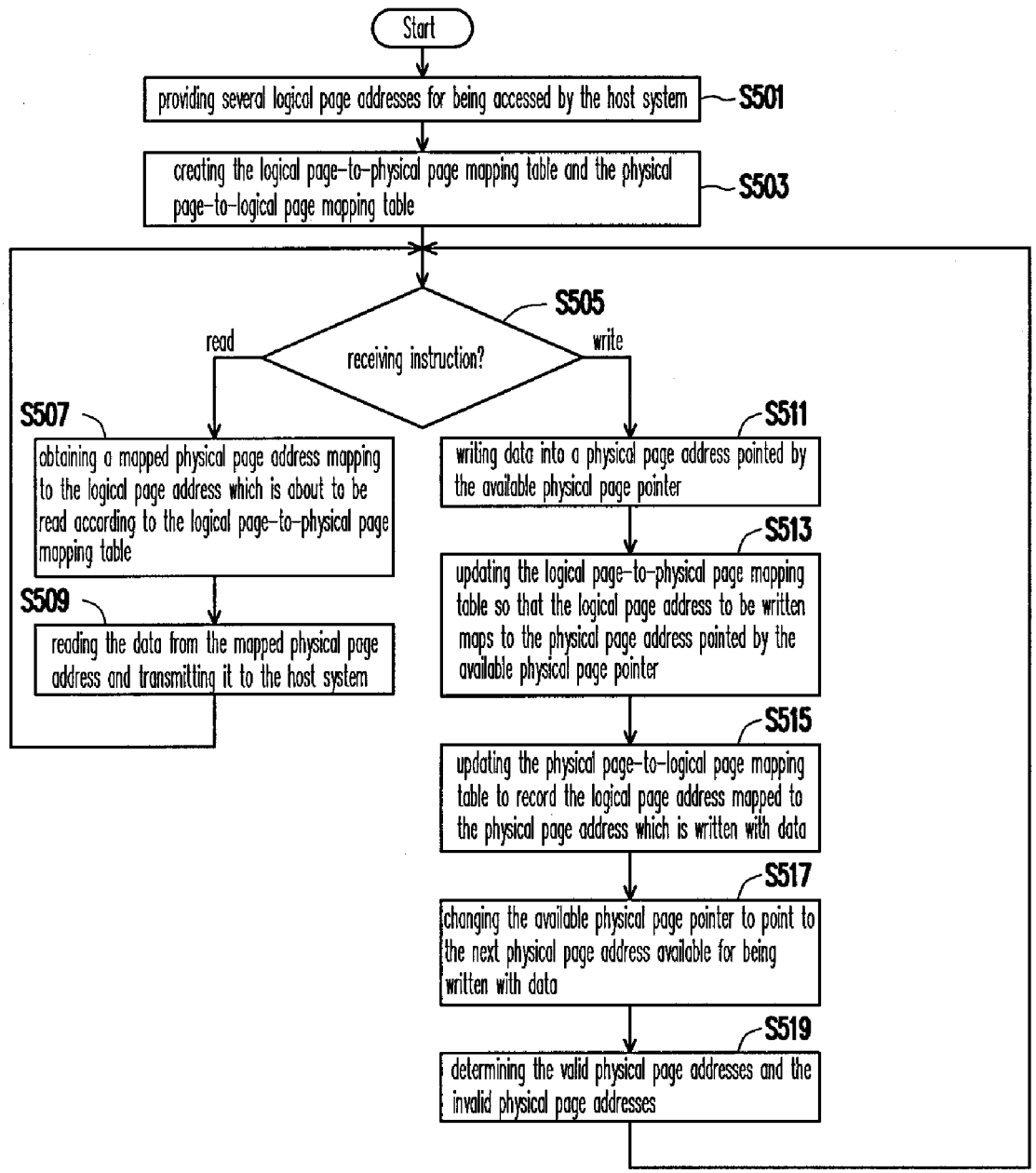
FIG. 5 is a flow chart showing an accessing operation of a flash memory storage system according to one embodiment of the invention.

FIG. 5 is a flow chart showing an accessing operation of a flash memory storage system according to one embodiment of the invention.

As shown in FIG. 5, when the flash memory storage system 100 is connected to the host system 200 and booted, several logical page addresses are provided for being accessed by the host system 200 in the step S501. Thereafter, in the step S503, the logical page-to-physical page mapping table 140 and the physical page-to-logical page mapping table 150 are created. Then, in the step S505, the flash memory storage system 100 is at a standby status and determines the received instructions.

While a read instruction is received in the step S505, a mapped physical page address mapping to the logical page address which is about to be read is obtained from the logical page-to-physical page mapping table 140 in the step S507, and the data is read from the mapped physical page address and transmitted to the host system 200 in the step S509. Thereafter, the flash memory storage system 100 is back to the standby status in the step S505. For example, when the storage area 220 of the flash memory chip 140 is at the status shown in FIG. 4B and the host system 200 is about to read the data from logical page address 1, the program instruction of the page management module 130e is executed to obtain the physical page address (L+1) mapping to the logical page address 1 from the logical page-to-physical page mapping table 140 and to read the data from the physical page address (L+1) and transmit the data to the host system 200.

While a write instruction is received in the step S505, the data is written into a physical page address pointed by the available physical page pointer in the step S511. Then, in the step S513, the logical page-to-physical page mapping table 140 is updated so that the logical page address to be written maps to the physical page address pointed by the available physical page pointer. Thereafter, in the step S515, the physical page-to-logical page mapping table 150 is updated to record the logical page address mapped to the physical page address which is written with data and, in the step S517, the available physical page pointer is changed to point to the next physical page address available for being written with data. Finally, in the step S519, the valid physical page addresses and the invalid physical page addresses are determined and recorded and then the flash memory storage system 100 is back to the status mentioned in the step S505. For example, when the storage area 220 of the flash memory chip 140 is at the status shown in FIG. 4B and the host system 200 is about to write the data into the logical page address 129, the program instruction of the page management module 130e is executed to write the data into the physical page address (L+2) and to update the logical page-to-physical page mapping table 140 and the physical page-to-logical page mapping table 150 as shown in FIG. 4C.

Noticeably, in the exemplar embodiment of the present invention, the program instruction of the page management module 130e is executed to compare the logical page-to-physical page mapping table 140 with the physical page-to-logical page mapping table 150 to determine which of the physical page addresses are invalid physical page addresses and which of the physical page addresses are valid physical page addresses. The invalid physical page address is the physical page address in which the stored data is invalid and outdated and the valid physical page address is the physical page address in which the stored data is the data to be written to the current logical page address by the host system.

For example, as shown in FIG. 4C, during the step of determining whether the physical page address 0 is a valid physical page address, the program instruction of the page management module 130e is executed to obtain the logical page address 0 which maps to the physical page address 0 from the physical page-to-logical page mapping table 150 and to obtain the physical page address 0 which maps to the logical page address 0 according to the logical page-to-physical page mapping table 140. Hence, the physical page address 0 is a valid physical page address. Furthermore, during the step of determining whether the physical page address 1 is a valid physical page address, the program instruction of the page management module 130e is executed to obtain the logical page address 1 which maps to the physical page address 1 from the physical page-to-logical page mapping table 150 and to obtain the physical page address (L+1) which maps to the logical page address 1 from the logical page-tophysical page mapping table 140. Therefore, the physical page address 1 is an invalid physical page address. Similarly, during the step of determining whether the physical page address 129 is a valid physical page address, the program instruction of the page management module 130e is executed to obtain the logical page address 129 which maps to the physical page address 129 from the physical page-to-logical page mapping table 150 and to obtain the physical page address (L+2) which maps to the logical page address 129 from the logical page-to-physical page mapping table 140. Consequently, the physical page address 129 is an invalid physical page address. That is, the program instruction of the page management module 130e is executed to obtain a mapped logical page address mapping to the physical page address to be determined according to the physical page-to-logical page mapping table 150 and to obtain a mapped physical page address mapping to the mapped logical page address according to the logical page-to-physical page mapping table 140. When the physical page address to be determined is identical to the mapped physical page address, the physical page address to be determined is a valid physical page address. Otherwise, the physical page address to be determined is an invalid physical page address.

Noticeably, since the physical block is the minimum unit to be erased in the flash memory chip 120, the program instruction of the page management module 130e is executed to merge the data in the valid physical page addresses so as to release the invalid physical page addresses for being written with new data. For example, the program instruction of the page management module 130e is executed to copy the data in the valid physical page addresses within at least one physical block to the physical page addresses within a non-written physical block which is not written with data and an erase operation is carried out on the physical block. Therefore, the dispersed valid data is merged and the invalid physical page addresses are released, which is denoted as the invalid data erasing process hereafter. It should be noticed that, after the valid data is merged to release invalid physical page addresses, the program instruction of the page management module 130e is executed to update the mapping relationships between the logical page addresses and the physical page addresses in the physical page-to-logical page mapping table 150 and the logical page-to-physical page mapping table 140.

Figure 6:
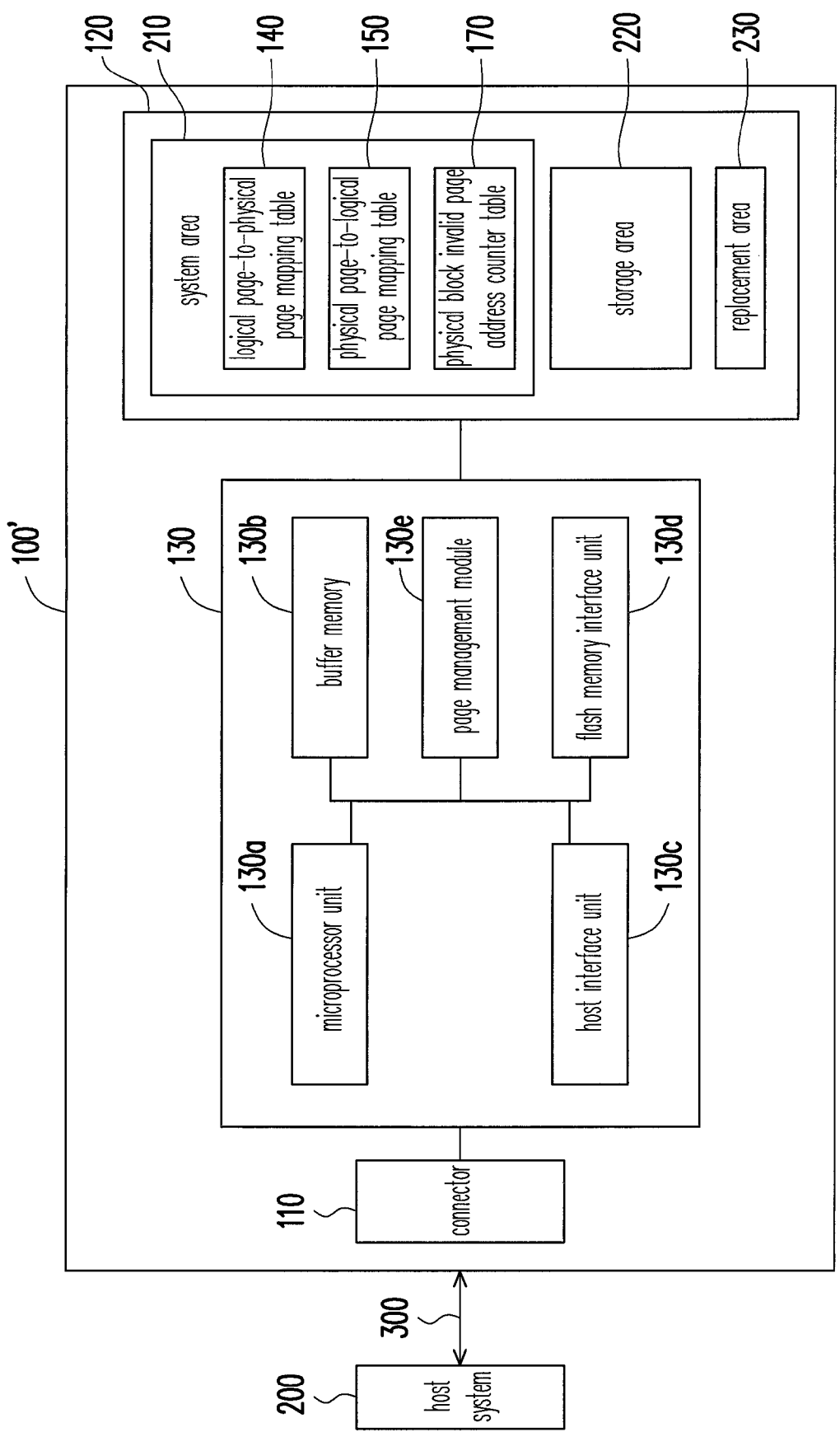
FIG. 6 is a schematic block diagram showing a flash memory storage system according to another embodiment of the invention.

In an exemplary embodiment of the present invention, the controller system further comprises a physical block invalid page address counter table 170 (as shown in the flash memory storage system 100' in FIG. 6) for recording a number of the invalid physical page addresses in each of the physical blocks 120-0 through 120-(S+D). Therefore, the number of the invalid physical page addresses in each of the physical blocks 120-0 through 120-(S+D) is used as a basis for merging data in the physical page addresses to release invalid physical page addresses. Similarly, the physical block invalid page address counter table 170 is stored in the system area 210 of the flash memory chip 120. Hence, the physical block invalid page address counter table 170 is loaded to the buffer memory 130b to be operated by the flash memory controller 130 executing the program instruction of the page management module 130e while the flash memory storage system 100 is operated and the physical block invalid page address counter table 170 is occasionally or regularly re-stored into the system area 210 of the flash memory chip 120 to prevent the updated contents from being lost caused by the abnormal power-off of the flash memory storage system 100.

FIG. 7 is a diagram showing examples of physical block invalid page address counter table according to one embodiment of the invention. The physical block invalid page address counter table 170 shown in FIG. 7 is corresponding to the exemplary of FIG. 4.

As shown in FIG. 7(a) and FIG. 4A, under the status corresponding to FIG. 4A, the physical block invalid page address counter table 170 is used to record the counter number of the invalid physical page addresses of each of the physical blocks 120-0 through 120-(S+D) to be zero.

As shown in FIG. 7(b) and FIG. 4B, under the status corresponding to FIG. 4B, since the data to be written to the logical page address 1 by the host system 200 is written to the physical page address (L+1), the program instruction of the page management module 130e is executed to update the mapping address of the logical page address 1 in the logical page-to-physical page mapping table 140 and to update the mapping address of the physical page address (L+1) in the physical page-to-logical page mapping table 150. More particularly, before the logical page-to-physical page mapping table 140 is updated, the program instruction of the page management module 130e is executed to obtain that the original mapped physical page address mapping to the logical page address 1 is the physical page address 1 and to add 1 on the counter number of the invalid physical page address with respect to the physical block 120-(S+1), which the physical page address 1 belongs to, in the physical block invalid page address counter table 170.

Similarly, shown in FIG. 7(c) and FIG. 4C, under the status corresponding to FIG. 4C, since the data to be written to the logical page address 129 by the host system 200 is written to the physical page address (L+2), the program instruction of the page management module 130e is executed to update the mapping address of the logical page address 129 in the logical page-to-physical page mapping table 140 and to update the mapping address of the physical page address (L+2) in the physical page-to-logical page mapping table 150. More particularly, before the logical page-to-physical page mapping table 140 is updated, the program instruction of the page management module 130e is executed to obtain that the original mapped physical page address mapping to the logical page address 129 is the physical page address 129 and to add 1 on the counter number of the invalid physical page address with respect to the physical block 120-(S+1), which the physical page address 129 belongs to, in the physical block invalid page address counter table 170.

For example, in one exemplary embodiment of the present invention, when the invalid data erasing process is implemented, at least one physical block having least number of the valid physical page addresses is selected, according to the physical block invalid page address counter table 170, to implement the data merging process.

Noticeably, the exemplary embodiment mentioned above is used to create the physical block invalid page address counter table 170 for counting the number of the invalid physical page addresses within each of the physical blocks. Furthermore, in another embodiment of the present invention, a physical block valid page address counter table can be also create to record the number of the valid physical page addresses within each of the physical blocks so that, when the invalid data erasing process is implemented, the physical block having least number of the valid physical page addresses is selected, according to the physical block valid page address counter table, to implement the data merging process.

Moreover, in one exemplary embodiment of the present invention, the controller system further comprises non-written physical block management table (not shown) for recording the non-written physical blocks which are not written with data. That is, the physical blocks which are recorded in the non-written physical block management table are the physical blocks which have been erased and can further be written with data. More particularly, the program instruction of the page management module 130e is executed to update the available physical page pointer according to the information provided by the non-written physical block management table. For example, when the available physical page pointer points to the physical page address 128D-1 and the write instruction is executed, the program instruction of the page management module 130e is executed to write data into the first physical page address in one of the non-written physical blocks and the first physical page address is pointed by the available physical page pointer according to the non-written physical block management table.

More specifically, as mentioned above, the non-written physical block is used to be written with data from the valid physical page addresses as the invalid data erasing process is implemented. Therefore, in an exemplary embodiment of the present invention, the program instruction of the page management module 130e is executed to implement the invalid data erasing process to release the invalid physical page addresses when it is determined that only one non-written physical block is left according to the non-written physical block management table. It should be noticed that the present invention is not limited to that the invalid data erasing process is implemented only at the time where only one non-written physical block is left.

Furthermore, in an exemplary embodiment of the present invention, the program instruction of the page management module 130e is executed to implement the data merging process to release the invalid physical page address when it is determined that at least one physical block having a ratio of the invalid physical page addresses therein to all the physical page addresses therein is larger than an invalid-physical-page-address threshold value. Herein, the invalid-physical-page-address threshold value can be customized by the user. It should be noticed that the smaller the invalid-physical-page-address threshold value is, the higher the frequency for implementing the data merging process is. Otherwise, the larger the invalid-physical-page-address threshold value is, the lower the frequency for implementing the data merging process is. In one exemplary embodiment of the present invention, the invalid-physical-page-address threshold value is set to be about 80%.

Additionally, in another exemplary embodiment of the present invention, the program instruction of the page management module 130e is executed to implement the erase operation on the physical block, in which none of the physical page addresses is valid, to release the invalid physical page addresses and then to record this physical block in the non-written physical block management table, when it is determined, that there is any physical block in which none of the physical page addresses is valid, according to the physical block invalid page address counter table 170.

Figure 8:
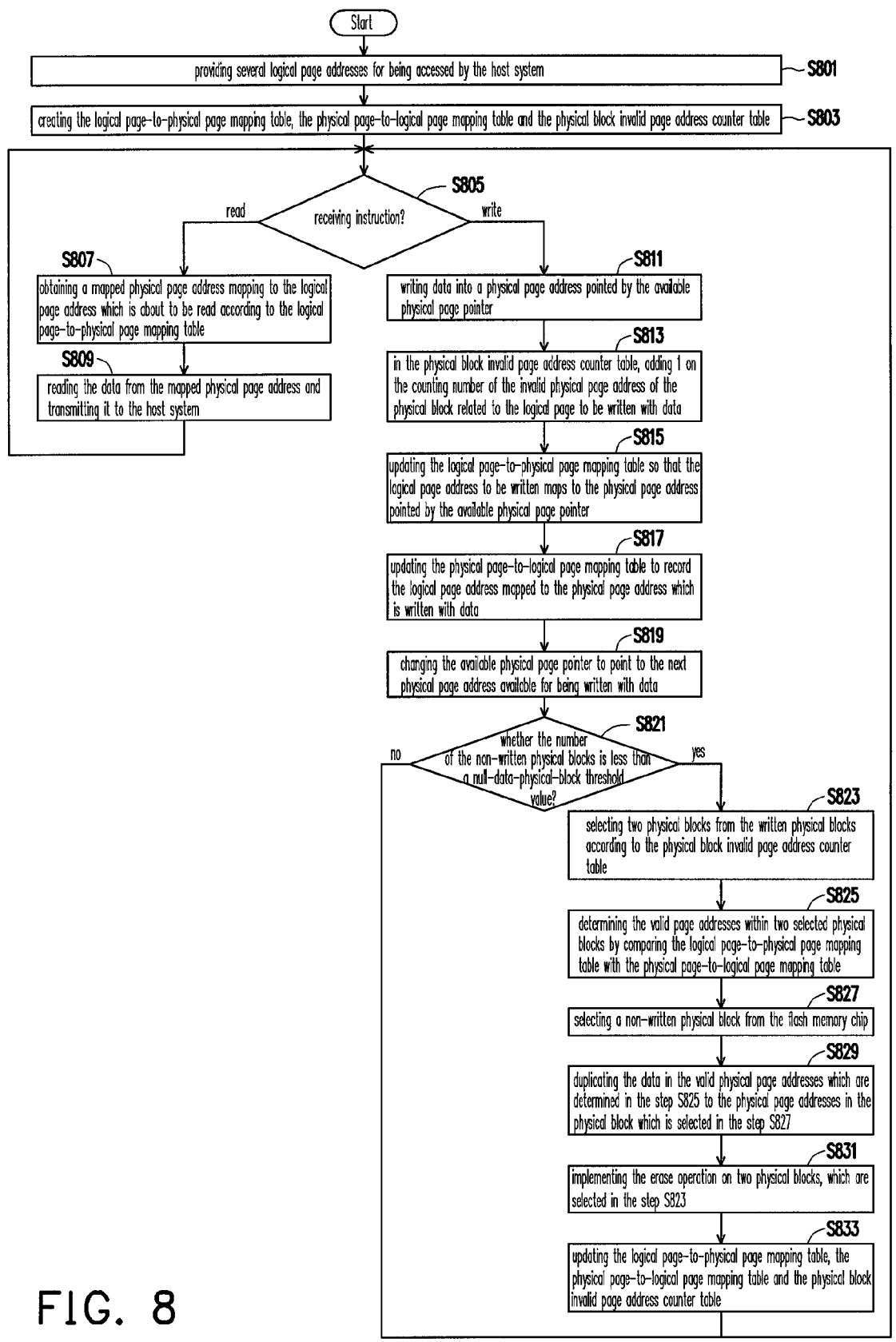
FIG. 8 is a flow chart showing an accessing operation of a flash memory storage system according to another embodiment of the invention.

FIG. 8 is a flow chart showing an accessing operation of a flash memory storage system 100' according to another embodiment of the invention.

As shown in FIG. 8, when the flash memory storage system 100 is connected to the host system 200 and booted, several logical page addresses are provided for being accessed by the host system 200 in the step S801. Thereafter, in the step S803, the logical page-to-physical page mapping table 140, the physical page-to-logical page mapping table 150 and the physical block invalid page address counter table 170 are created. Then, in the step S805, the flash memory storage system 100 is at a standby status and determines the received instructions.

While a read instruction is received in the step S805, a mapped physical page address mapping to the logical page address which is about to be read is obtained from the logical page-to-physical page mapping table 140 in the step S807, and the data is read from the mapped physical page address and transmitted to the host system 200 in the step S809. Thereafter, the flash memory storage system 100 is back to the standby status in the step S805.

While a write instruction is received in the step S805, the data is written into a physical page address pointed by the available physical page pointer in the step S811. Then, in the step S813, in the physical block invalid page address counter table 170, the counting number of the invalid physical page address of the physical block related to the logical page to be written with data is added 1 thereon. Thereafter, in the step S815, the logical page-to-physical page mapping table 140 is updated so that the logical page address to be written maps to the physical page address pointed by the available physical page pointer. Then, in the step S817, the physical page-to-logical page mapping table 150 is updated to record the logical page address mapped to the physical page address which is written with data and, in the step S819, the available physical page pointer is changed to point to the next physical page address available for being written with data.

Particularly, after the write operation, whether the number of the non-written physical blocks is less than a null-data-physical-block threshold value is determined in the step S821 (for example, as the condition mentioned above, the null-data-physical-block threshold value is set to be 1). In the step S821, when the number of the non-written physical blocks is less than the null-data-physical-block threshold value, the invalid data erasing process is implemented. For example, in the step S823, two physical blocks are selected from the written physical blocks according to the physical block invalid page address counter table. For example, two selected physical blocks are the physical blocks having least numbers of valid physical page addresses among the written physical blocks which are written with data, and, in the step S825, the valid page addresses within two selected physical blocks are determined by comparing the logical page-to-physical page mapping table 140 with the physical page-to-logical page mapping table 150.

Thereafter, in the step S827, a non-written physical block is selected from the flash memory chip 120 and, in the step S829, the data in the valid physical page addresses which are determined in the step S825 is duplicated to the physical page addresses in the physical block which is selected in the step S827. Then, in the step S831, the erase operation is implemented on two physical blocks, which are selected in the step S823, to release available storage spaces. Finally, in the step S833, the logical page-to-physical page mapping table 140, the physical page-to-logical page mapping table 150 and the physical block invalid page address counter table 170 are updated to finish the invalid data erasing process and the flash memory storage system 100 is back to the standby status in the step S805.

It should be understood that although, in FIG. 8, the invalid data erasing process is implemented by selecting two written physical blocks and using one non-written physical block, the present invention is not limited to herein. During the invalid data erasing process, one or more written physical blocks can be selected for the invalid data erasing step and one or more non-written physical blocks can be selected for storing the merged valid data.

Figure 9:
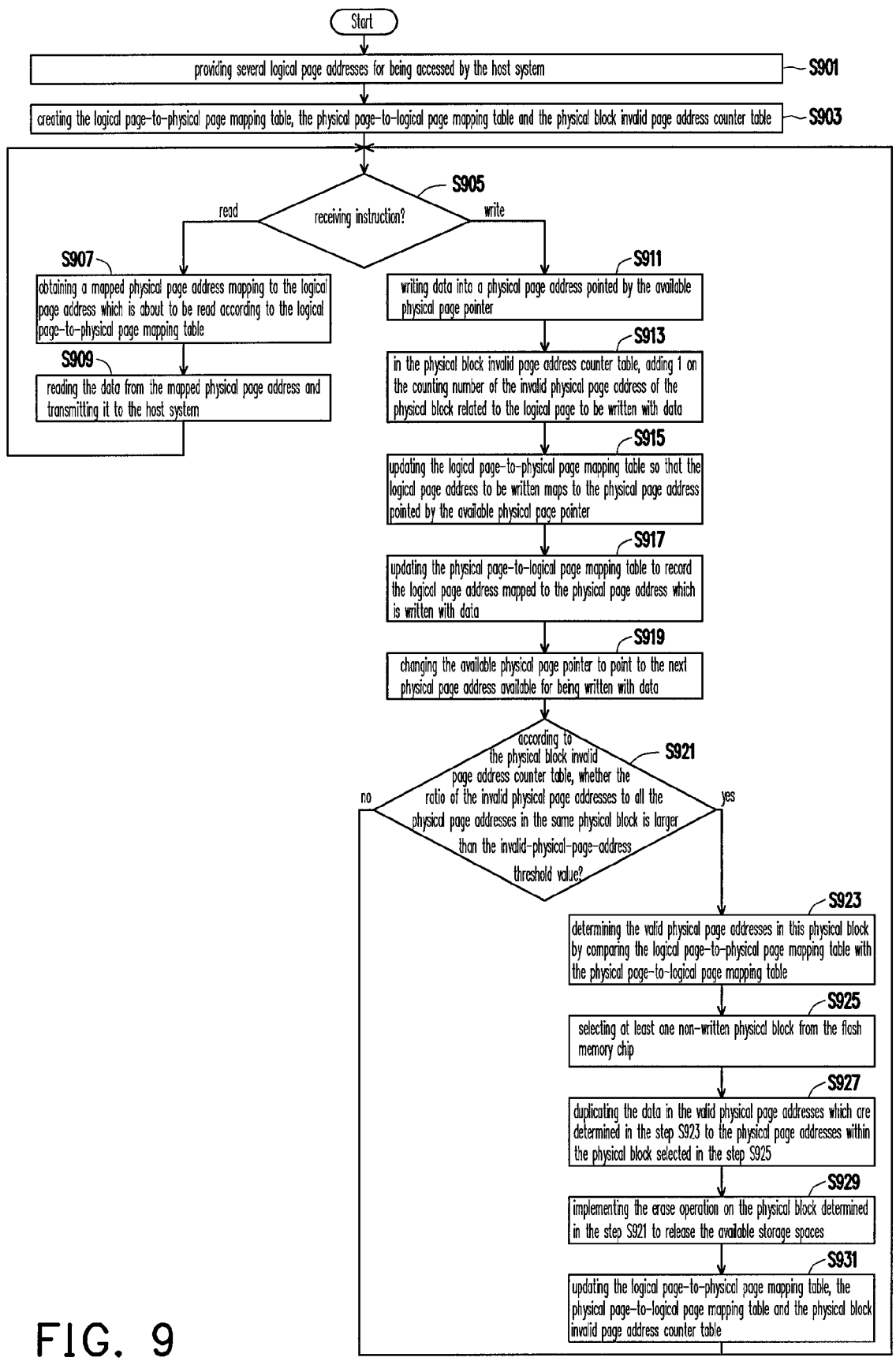
FIG. 9 is a flow chart showing an accessing operation of a flash memory storage system according to another embodiment of the invention.

FIG. 9 is a flow chart showing an accessing operation of a flash memory storage system 100' according to another embodiment of the invention.

As shown in FIG. 9, steps S901, S903, S905, S907, S909, S911, S913, S915, S917 and S919 are the same as the steps S801, S803, S805, S807, S809, S811, S813, S815, S817 and S819 respectively and are not described herein.

In the step S921, according to the physical block invalid page address counter table 170, whether the ratio of the invalid physical page addresses to all the physical page addresses in the same physical block is larger than the invalid-physical-page-address threshold value (which can be, for example but not limited to, about 80% in this exemplary embodiment) is determined. In the step S921, when at least one physical block in which the ratio of the invalid physical page addresses to all the physical page addresses is larger than the invalid-physical-page-address threshold value is determined, the invalid data erasing process is implemented (as shown in steps S923 through S931, for example).

In the step S923, the valid physical page addresses in this physical block are determined by comparing the logical page-to-physical page mapping table 140 with the physical page-to-logical page mapping table 150.

Then, in the step S925, at least one non-written physical block is selected from the flash memory chip 120 according to the determined number of the physical blocks with the ratio of the invalid physical page addresses to all the physical page addresses larger than the invalid-physical-page-address threshold value, and, in the step S927, the data in the valid physical page addresses which are determined in the step S923 is duplicated to the physical page addresses within the physical block selected in the step S925. Then, in the step S929, the erase operation is implemented on the physical block determined in the step S921 to release the available storage spaces. Finally, in the step S931, the logical page-to-physical page mapping table 140, the physical page-to-logical page mapping table 150 and the physical block invalid page address counter table 170 are updated to finish the invalid data erasing process and the flash memory storage system 100 is back to the standby status in the step S905.

Figure 10:
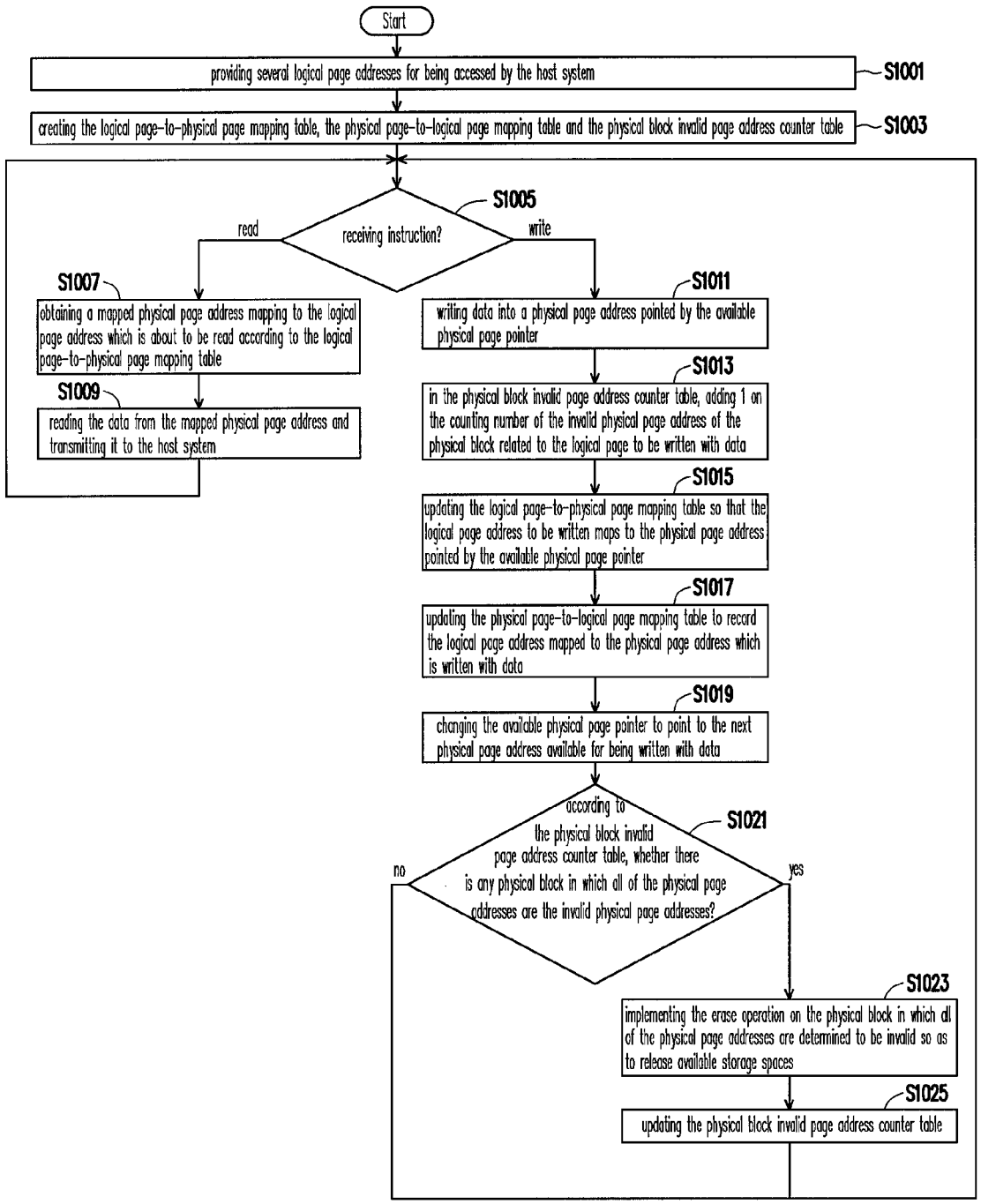
FIG. 10 is a flash memory storage system according to another embodiment of the invention.

FIG. 10 is a flash memory storage system 100' according to another embodiment of the invention.

As shown in FIG. 10, steps S1001, S1003, S1005, S1007, S1009, S1011, S1013, S1015, S1017 and S1019 are the same as the steps S801, S803, S805, S807, S809, S811, S813, S815, S817 and S819 and are not described herein.

In the step S1021, according to the physical block invalid page address counter table 170, the step of determining whether there is any physical block in which all of the physical page addresses are the invalid physical page addresses is performed. If, in the step S1021, there is the physical block in which all of the physical page addresses are the invalid physical page addresses, the erase operation is implemented on the physical block in which all of the physical page addresses are determined to be invalid so as to release available storage spaces in the step S1023. Finally, in the step S1025, the physical block invalid page address counter table is updated to finish the data merging process and the flash memory storage system 100' is back to the standby status in the step S1005.

It should be understood that, in the aforementioned FIG. 5, FIG. 8, FIG. 9 and FIG. 10, although the step of the end operation is not shown, the skill artisan of the field can easily realize that, at the time the flash memory storage system stops operating, the process steps are terminated as well. Additionally, the order of the aforementioned steps shown in FIG. 5, FIG. 8, FIG. 9 and FIG. 10 is not used to limit the scope of the present invention and the skill artisan of the field can easily practice the present invention according to the concepts of the present invention without following the order shown in the exemplary embodiments.

Altogether, in the exemplary embodiment of the present invention, the logical page-to-physical page mapping table and the physical page-to-logical page mapping table are used to record the mapping relationships between the logical page addresses and the physical page addresses. Therefore, the write operation is operated on the flash memory chip on a page-by-page basis. Hence, the performance of the flash memory storage system is effectively improved. Moreover, the invalid physical page addresses and the valid physical page addresses are determined by comparing the logical page-to-physical page mapping table with the physical page-to-logical page mapping table so that the data merging process is implemented and the invalid physical page addresses are released. Furthermore, in the exemplary embodiment of the present invention, the physical block invalid page address counter table is used to record the number of the invalid page addresses of each of the physical blocks so that the physical block which can release more spaces after being erased can be quickly determined. Therefore, the performance of the flash memory storage system is improved.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A data accessing method operated by a flash memory controller to access data from a plurality of physical page addresses of a plurality of physical blocks in at least a flash memory chip, comprising:

providing a plurality of logical page addresses for being accessed by a host system;

creating a logical page-to-physical page mapping table to record the physical page addresses mapping to the logical page addresses respectively;

creating a physical page-to-logical page mapping table to record the logical page addresses mapping to the physical page addresses respectively;

receiving a data to be written and a logical page address to be written from the host system, writing the data to be written into one of the physical page addresses, updating the logical page-to-physical page mapping table to record the logical page address to be written mapping to the physical page address, in which the data to be written is written, and updating the physical page-to-logical page mapping table to record the physical page address, in which the data to be written is written, mapping to the logical page address to be written; and comparing the logical page-to-physical page mapping table with the physical page-to-logical page mapping table to determine a plurality of valid physical page addresses and a plurality of invalid physical page addresses among the written physical page addresses.

2. The data accessing method of claim 1 further comprising:

creating a physical block invalid page address counter table to record a number of the invalid physical page addresses in each of the physical blocks; and updating the number of the invalid physical page address of the physical page address which is originally mapped to the logical page address to be written.

3. The data accessing method of claim 1 further comprising:
creating a physical block valid page address counter table to record a number of the valid physical page addresses of each of the physical blocks; and
updating the number of the valid physical page address of the physical page address which is originally mapped to the logical page address to be written.

4. The data accessing method of claim 2 further comprising:
determining whether a number of the non-written physical blocks is less than a null-data-physical-block threshold value, wherein when the number of the non-written physical blocks is less than the null-data-physical-block threshold value, an invalid data erasing process is implemented and the invalid data erasing process comprises:
according to the physical block invalid page address counter table, selecting at least a first physical block from the written physical blocks;
selecting at least a second physical block from the non-written physical blocks;
duplicating data written in the valid physical page addresses in the at least first physical block into the physical page addresses of the at least second physical block;
updating the logical page-to-physical page mapping table, the physical page-to-logical page mapping table and the physical block invalid page address counter table; and
erasing the at least first physical block.

5. The data accessing method of claim 4, wherein the at least first physical block has least number of the valid physical page addresses among the written physical blocks.

6. The data accessing method of claim 4 further comprising creating a null data physical block management table for recording the non-written physical blocks.

7. The data accessing method of claim 1, wherein the step for comparing the logical page-to-physical page mapping table with the physical page-to-logical page mapping table to determine the valid physical page addresses and the invalid physical page addresses among the written physical page addresses comprises:
selecting a physical page address to be determined from the physical page addresses;
obtaining a mapped logical page address mapping to the physical page address to be determined according to the physical page-to-logical page mapping table;
obtaining a mapped physical page address mapping to the mapped logical page address according to the logical page-to-physical page mapping table; and
determining whether the mapped physical page address is identical to the physical page address to be determined, wherein if the mapped physical page address is identical to the physical page address to be determined, the physical page address to be determined is determined to be valid, but if the mapped physical page address is not identical to the physical page address to be determined, the physical page address to be determined is determined to be invalid.

8. The data accessing method of claim 2 further comprising:
according to the physical block invalid page address counter table, determining whether a ratio of the invalid physical page addresses in at least a first physical block of the written physical blocks to all the physical page addresses in the at least first physical block is larger than an invalid-physical-page-address threshold value, wherein when the ratio of the invalid physical page addresses in the at least first physical block to all the physical page addresses in the at least first physical block is larger than the invalid-physical-page-address threshold value, an invalid data erasing process is implemented and the invalid data erasing process comprises:
selecting at least a second physical block from the non-written physical blocks;
duplicating data written in the valid physical page addresses in the at least first physical block into the physical page addresses of the at least second physical block;
updating the logical page-to-physical page mapping table, the physical page-to-logical page mapping table and the physical block invalid page address counter table; and
erasing the at least first physical block.

9. The data accessing method of claim 2 further comprising:
according to the physical block invalid page address counter table, determining whether there are the valid physical page addresses in the at least first physical block of the written physical blocks, wherein when there is no valid physical page address in the at least first physical block, the at least first physical block is erased and the physical block invalid page address counter table is updated.

10. The data accessing method of claim 1 further comprising creating an available physical page pointer to point out a next physical page address which is available among the physical page addresses.

11. A controller system for writing data into a plurality physical page addresses of a plurality of physical blocks in at least a flash memory chip, comprising:
a host interface unit for connecting to a host system;
a microprocessor unit for receiving a data to be written and a logical page address to be written from the host system;
a flash memory interface unit for connecting the at least flash memory chip;
a buffer memory for temporally storing data;
a logical page-to-physical page mapping table for recording the physical page addresses mapping to a plurality of logical page addresses respectively;
a physical page-to-logical page mapping table for recording the logical page addresses mapping to the physical page addresses respectively; and
a page management module for writing the data to be written into one of the physical page addresses, updating the logical page-to-physical page mapping table to record the logical page address to be written mapping to the physical page address, in which the data to be written is written, and updating the physical page-to-logical page mapping table to record the physical page address, in which the data to be written is written, mapping to the logical page address to be written, wherein the page management module compares the logical page-to-physical page mapping table with the physical page-to-logical page mapping table to determine a plurality of valid physical page addresses and a plurality of invalid physical page addresses among the written physical page addresses.

12. The controller system of claim 11 further comprising a physical block invalid page address counter table for recording a number of the invalid physical page addresses in each of the physical blocks, wherein the page management module further updates the number of the invalid physical page address of the physical page address which is originally mapped to the logical page address to be written in the physical block invalid page address counter table.

13. The controller system of claim 11 further comprising a physical block valid page address counter table for recording a number of the valid physical page addresses of each of the physical blocks, wherein the page management module further updates the number of the valid physical page address of the physical page address which is originally mapped to the logical page address to be written in the physical block valid page address counter table.

14. The controller system of claim 12, wherein the page management module further determines whether a number of the non-written physical blocks is less than a null-data-physical-block threshold value, wherein when the number of the non-written physical blocks is less than the null-data-physical-block threshold value, the page management module further selects at least a first physical block from the written physical blocks according to the physical block invalid page address counter table, selects at least a second physical block from the non-written physical blocks, duplicates data written in the valid physical page addresses in the at least first physical block into the physical page addresses of the at least second physical block, updates the logical page-to-physical page mapping table, the physical page-to-logical page mapping table and the physical block invalid page address counter table and erases the at least first physical block.

15. The controller system of claim 14, wherein the at least first physical block has least number of the valid physical page addresses among the written physical blocks.

16. The controller system of claim 14 further comprising a null data physical block management table for recording the non-written physical blocks.

17. The controller system of claim 11, wherein the page management module selects a physical page address to be determined from the physical page addresses, obtains a mapped logical page address mapping to the physical page address to be determined according to the physical page-to-logical page mapping table, obtains a mapped physical page address mapping to the mapped logical page address according to the logical page-to-physical page mapping table and determines whether the mapped physical page address is identical to the physical page address to be determined, wherein if the mapped physical page address is identical to the physical page address to be determined, the physical page address to be determined is determined to be valid, but if the mapped physical page address is not identical to the physical page address to be determined, the physical page address to be determined is determined to be invalid.

18. The controller system of claim 12, wherein the page management module further determines whether a ratio of the invalid physical page addresses in at least a first physical block of the written physical blocks to all the physical page addresses in the at least first physical block is larger than an invalid-physical-page-address threshold value according to the physical block invalid page address counter table, wherein when the ratio of the invalid physical page addresses in the at least first physical block to all the physical page addresses in the at least first physical block is larger than the invalid-physical-page-address threshold value, the page management module selects at least a second physical block from the non-written physical blocks, duplicates data written in the valid physical page addresses in the at least first physical block into the physical page addresses of the at least second physical block, updates the logical page-to-physical page mapping table, the physical page-to-logical page mapping table and the physical block invalid page address counter table and erases the at least first physical block.

19. The controller system of claim 12, wherein the page management module further determines whether there are the valid physical page addresses in the at least first physical block of the written physical blocks according to the physical block invalid page address counter table, wherein when there is no valid physical page address in the at least first physical block, the page management module erases the at least first physical block and updates the physical block invalid page address counter table.

20. The controller system of claim 11 further comprising an available physical page pointer to pointing out a next physical page address which is available among the physical page addresses.

21. A flash memory storage system comprising:
a plurality of physical page addresses, wherein the physical page addresses belong to a plurality of physical blocks;
a connector for connecting a host system;
a logical page-to-physical page mapping table for recording the physical page addresses mapping to a plurality of logical page addresses respectively;
a physical page-to-logical page mapping table for recording the logical page addresses mapping to the physical page addresses respectively; and
a flash memory controller, which is electrically connected with the physical page addresses and the connector, for receiving a data to be written and a logical page address to be written from the host system, wherein the flash memory controller further writes the data to be written into one of the physical page addresses, updates the logical page-to-physical page mapping table to record the logical page address to be written mapping to the physical page address, in which the data to be written is written, and updates the physical page-to-logical page mapping table to record the physical page address, in which the data to be written is written, mapping to the logical page address to be written, wherein the flash memory controller compares the logical page-to-physical page mapping table with the physical page-to-logical page mapping table to determine a plurality of valid physical page addresses and a plurality of invalid physical page addresses among the written physical page addresses.

22. The flash memory storage system of claim 21 further comprising a physical block invalid page address counter table for recording a number of the invalid physical page addresses in each of the physical blocks, wherein the flash memory controller further updates the number of the invalid physical page address of the physical page address which is originally mapped to the logical page address to be written in the physical block invalid page address counter table.

23. The flash memory storage system of claim 21 further comprising a physical block valid page address counter table for recording a number of the valid physical page addresses of each of the physical blocks, wherein the flash memory controller further updates the number of the valid physical page address of the physical page address which is originally mapped to the logical page address to be written in the physical block valid page address counter table.

24. The flash memory storage system of claim 22, wherein the flash memory controller further determines whether a number of the non-written physical blocks is less than a null-data-physical-block threshold value, wherein when the number of the non-written physical blocks is less than the null-data-physical-block threshold value, the flash memory controller further selects at least a first physical block from the written physical blocks according to the physical block invalid page address counter table, selects at least a second physical block from the non-written physical blocks, duplicates data written in the valid physical page addresses in the at least first physical block into the physical page addresses of the at least second physical block, updates the logical page-to-physical page mapping table, the physical page-to-logical page mapping table and the physical block invalid page address counter table and erases the at least first physical block.

25. The flash memory storage system of claim 21, wherein the flash memory controller selects a physical page address to be determined from the physical page addresses, obtains a mapped logical page address mapping to the physical page address to be determined according to the physical page-to-logical page mapping table, obtains a mapped physical page address mapping to the mapped logical page address according to the logical page-to-physical page mapping table and determines whether the mapped physical page address is identical to the physical page address to be determined, wherein if the mapped physical page address is identical to the physical page address to be determined, the physical page address to be determined is determined to be valid, but if the mapped physical page address is not identical to the physical page address to be determined, the physical page address to be determined is determined to be invalid.

* * * * *